United States Patent [19]

Farmer

[11] Patent Number: 4,867,202
[45] Date of Patent: Sep. 19, 1989

[54] CURTAIN VALVE ARRANGEMENT

[75] Inventor: David K. Farmer, Niles, Ill.

[73] Assignee: Cargo Walker, Inc., Minneapolis, Minn.

[21] Appl. No.: 271,046

[22] Filed: Nov. 14, 1988

[51] Int. Cl.$^4$ .................. F16K 3/28; F16K 31/30; F16K 11/06

[52] U.S. Cl. .................. 137/625.66; 137/625.18; 137/625.25; 137/625.48; 251/31; 251/901

[58] Field of Search .................. 137/625.18, 625.25, 137/625.48, 625.66; 251/31, 901

[56] References Cited

U.S. PATENT DOCUMENTS

| | | | |
|---|---|---|---|
| 3,263,922 | 8/1966 | Voit | 137/557 X |
| 3,312,244 | 4/1967 | Voit | 251/31 X |
| 3,370,613 | 2/1968 | Weaver | 137/625.69 |
| 3,428,073 | 2/1969 | Krueger | 137/625.25 X |
| 4,019,535 | 4/1977 | Buckethal | 137/625.41 |
| 4,224,958 | 9/1980 | Kaplan et al. | 137/625.18 X |
| 4,392,510 | 7/1983 | Heckmann et al. | |
| 4,469,133 | 9/1984 | Boesing et al. | |
| 4,561,471 | 12/1985 | Diaz | |
| 4,726,398 | 2/1988 | Barree | |

Primary Examiner—Gerald A. Michalsky
Attorney, Agent, or Firm—Merchant, Gould, Smith, Edell, Welter & Schmidt

[57] ABSTRACT

A valve arrangement is provided which comprises a valve body and a flexible curtain member. The valve body defines at least one fluid flow conduit, and a transverse curtain member track. The flexible curtain member is slidable positioned within the curtain member track, with ends projecting outwardly therefrom. Opposite ends of the curtain member are anchored securely in position, to define a curtain member orientation having opposite roll-cups defined thereby, projecting outwardly from the curtain member track. As a result of the roll-cups, the curtain member can slide between first and second extreme positions, to operate the valve arrangement.

29 Claims, 4 Drawing Sheets

CURTAIN VALVE ARRANGEMENT

FIELD OF THE INVENTION

The present invention concerns valve arrangements. In a particular embodiment of application, the invention concerns arrangements for alternating application of fluid pressure and draw, to a fluid line. In particular, the invention concerns such an arrangement which operates upon motion of a flexible valve curtain.

BACKGROUND OF THE INVENTION

In some applications it is desirable to apply cycling fluid flow pressures to a chamber or line. For example, alternating gas (e.g. air) pressure and draw (vacuum) may be needed in a flow line or chamber. This may be necessary, for example, if alternating expansion and contraction of an inflatable member is desired. A specific example of this is represented by the cargo transportation system which is the subject matter of applicant's copending application, Ser. No. 108,109, incorporated herein by reference.

A typical methodology that could be utilized to provide for alternating fluid flows to a single line, is through utilization of a two-way valve arrangement. For such an arrangement, the valve would be provided with a first (fluid inlet) line, a second (vacuum draw) line, and a single (third line) fluid flow outlet. The single fluid flow outlet would be in operative communication with a chamber to be subjected to the cycling fluid flows (pressure and draw). The first line, for example, could be connected to an air compressor, with the second line being in operative connection to a vacuum pump. The valve would be provided with a stopcock or other valve member selectively adjustable to allow fluid flow through the valve from the first line to the outlet, or alternatively from the outlet to the second (vacuum draw) line. Thus, the valve would have two possible fluid flow settings. Such a value is referred to herein as a two-way valve. It will be understood that if such a valve were arranged in a system having a constant pressure applied to the first line and a constant vacuum applied to the second line, alternating pressure and vacuum could be applied to the outlet line, by simply switching the valve. It is noted that cycling of pressures, or fluid types, could be provided in a similar system if instead of being associated with a vacuum draw, the second line were in communication with a fluid source different from that of the first line. Similarly, both the first and second lines could be draw lines, with the third line operating as an inlet rather than an outlet.

At least arguably, a wide variety of two-way valve arrangements, whether developed for the movement of highly viscous liquids, less viscous liquids, or gases, could be adapted for use in situations involving cycling of fluid pressure or service to a single third) line. However, for applications in arrangements such as that of U.S. Ser. No. 108,109, many conventional valves would be generally unacceptable. The reasons for this often include at least the following:

1. In some applications it is necessary, or at least desirable, that a rather large volume of fluid be passed through the valve in a very short period of time. Many conventional valve arrangements are substantially restrictive with respect to fluid flow, and thus are not readily adaptable to such uses.

2. If very rapid cycling between the two flow settings is needed, many conventional arrangements are not acceptable. For example, they may involve large, bulky, heavy and/or inefficiently designed valve members which, although they accommodate conventional applications rather well, are ineffective for rapid switching.

3. It is foreseen that at least in some applications, a very high rate of cycling for an extended period of time may be required, for operation of the system. Many conventional arrangements would not be appropriate for use in situations involving a great many cycles of the valve. For example, in some conventional arrangements, repeated movement of adjacent parts, in a relatively short time, leads to sufficient wearing of components for generation of leaks.

It will be understood that the above list is only exemplary of the types of problems encountered in adapting many conventional two-way valving arrangements, to situations wherein rapid, repeated, cycling between substantial fluid flows is needed.

OBJECTS OF THE INVENTION

Therefore, it is an object of the present invention to provide a particularly effective and efficient valve arrangement. For the preferred embodiment, the arrangement is for use as a two-way valve, in order to apply cycling fluid flow to a single outlet. It is particularly an object to provide such an arrangement well adapted for use when the fluid flow involves alternating application of fluid pressure and fluid draw, to a single line.

The objects of the present invention further include the provision of a preferred such arrangement: which is relatively resistant to undesirable wear and/or leaking with use in circumstances involving a high amount of cycling; which is relatively inexpensive to produce, assemble and operate; and, which can be readily controlled and switched.

Other objects and advantages of the present invention will become apparent from the following descriptions, taken in connection with the accompanying drawings, wherein are set forth by way of illustration and example certain embodiments of the present invention.

SUMMARY OF THE INVENTION

The present invention concerns a type of curtain valve arrangement or valve. For the preferred embodiment described and shown, the valve arrangement involved is a two-way valve. That is, the valve arrangement operates to control fluid flow along two separate courses. It will be understood that the principles of the present invention may be applied to other arrangements, for example one-way systems.

Valve arrangements according to the present invention include: a valve body having at least one fluid flow passageway therethrough; and, a flexible valve member or curtain member operably movable to selectively open and close the selected fluid flow passageway(s). The curtain member comprises an elongate, flexible, member having opposite ends which are anchored in position. In assembly, the curtain member is anchored in an orientation defining first and second bends or roll-cups. Without movement of the anchored ends, a central portion of the curtain member is slidable, due to deformation of the roll-cups, between two extreme positions. That is, with the ends of the curtain member anchored, the roll-cups deform to allow the central portion of the curtain member to be slidably displaced between two extreme positions. Selective movement between the two extreme positions, facilitates valve operation. The movement is generated by an actuator arrangement or biasing means described further below.

A preferred curtain member is provided with at least one fluid flow aperture therein, which can be selectively moved to open selected fluid flow passageway(s), upon sliding movement of the flexible curtain member. In one embodiment shown in the drawings and involving a valve body having two fluid flow passageways, the curtain member is provided with a single aperture, which can be moved selectively between association with each of two fluid flow passageways in the valve body. In an alternate embodiment shown in the drawings, and also involving a valve body having two fluid flow passageways, the curtain member is provided with two apertures operably positioned to facilitate a particularly rapid cycling of the valve arrangement.

Preferably, the valve member or curtain member is made from an elongate, substantially flat, relatively thin, piece of material such as stainless steel or the like. For example, sheet metal having thickness on the order of about 0.001 to 0.005 inches (0.002–0.013 cm) can be used. Such curtain members are of such a light weight, that they can be readily deformed and moved with only relatively small amounts of force.

In general, for valve arrangements according to the present invention, the flexible curtain member is operably received within a curtain member track, defined in the valve body. Generally, the curtain member track extends transversely to the fluid flow conduit(s). In the preferred embodiment, the curtain member track extends perpendicularly to a longitudinal axis of the fluid flow conduit(s).

For the preferred embodiment, force to generate movement of the valve member or curtain member between extreme positions, is provided by means of air pulses, from a small compressor or the like. Such small pulses of air can be readily controlled by conventional valve arrangements, for example with computer timing control. The small pulses of air can be used, as a result of the described arrangements, to generate movement of the large curtain member, and thus to control movement of relatively large amounts of air. In such arrangements, a valve arrangement actuator or biasing means, which facilitates operation upon application of air pulses to the curtain member, includes an air flow directing means or conduit arrangement in the valve body.

Valve arrangements according to the present invention, for example, can be readily used to control movement of about 150–300 ft$^3$/min of air, in a two-way valve cycling between a positive air pressure of 1 atmosphere, and a vacuum of 0.5 atmosphere, with switching being readily accomplished on time periods of about 10–60 milliseconds. The control pressure, or pulses of air needed to control motion of the curtain member, need only be about 5–40 psi, and can be provided through a relatively small bore tubing.

The drawings constitute a part of this specification, and include exemplary embodiments of the present invention while illustrating various objects and features thereof. It will be understood that in some instances, relative component sizes and material thicknesses may be shown exaggerated to facilitate an understanding of the invention.

DETAILED DESCRIPTION OF THE INVENTION

As required, detailed descriptions of the present invention are disclosed herein. It is to be understood that while various embodiments of the present invention are described and shown, the invention is not to be understood as limited to the specific embodiments depicted, but rather as limited by the claims.

Figure 1:
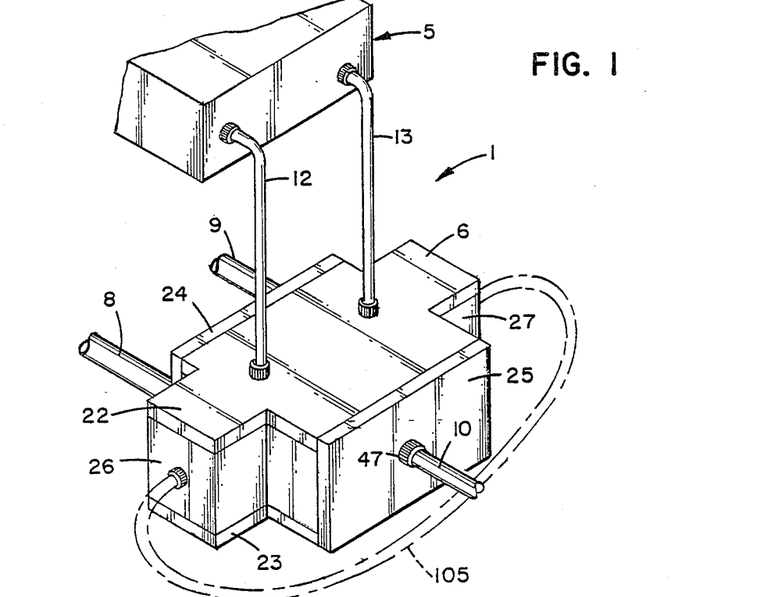
FIG. 1 is a fragmentary environmental perspective view of a valve arrangement according to the present invention shown in operative combination with a pulse control unit; an optional accessory being shown in phantom lines.

The reference number 1, FIG. 1, generally designates a valve arrangement or assembly according to the present invention. In FIG. 1, the valve arrangement 1 is shown in perspective, and in association with a control unit or pump system 5.

The particular valve arrangement 1 depicted is a two-way valve 6 having, in association therewith: a first (in this instance inlet) line 8; a second (in this instance vacuum) line 9; and, a third or main trunk line 10. The trunk line 10 is the line which by means of switching of the two-way valve 6, is provided with cycling alternating fluid pressures therein. The trunk line 10 may, for example, communicate with a chamber or plurality of chambers to be cycled between expansion and collapse. For example, trunk line 10 may communicate with expandable bladders in a cargo transport system such as that shown in applicant's co-pending application Ser. No. 108,109.

In FIG. 1, the control unit 5 is shown having first and second fluid flow lines 12 and 13, respectively, in fluid flow communication with the two-way valve 6. By fluid flow through lines 12 and 13, unit 5 can be used to control operation of the two-way valve 6. This control will be understood from the further description below.

Figure 2:
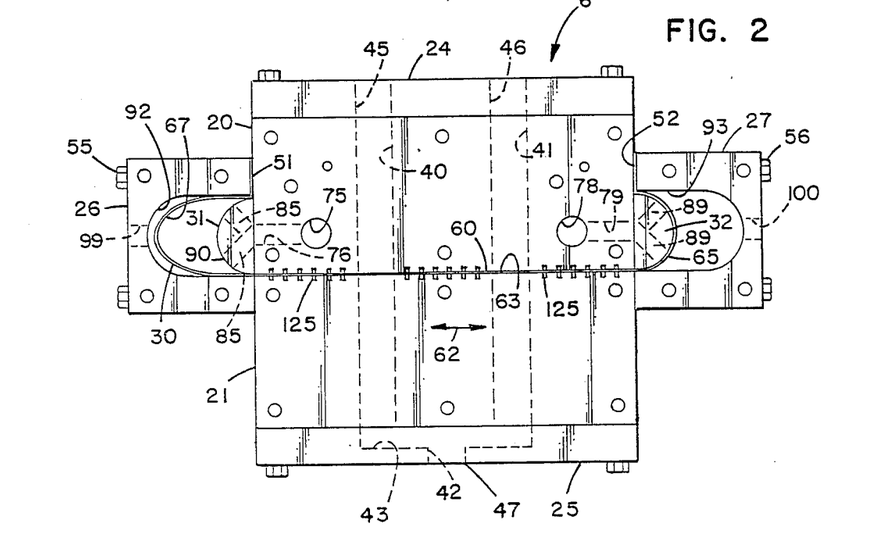
FIG. 2 is a top plan view of the valve arrangement shown in FIG. 1, with a top plate removed and with phantom lines indicating selected portions hidden from view; the arrangement in FIG. 2 being depicted with a curtain member thereof in an extreme (left) position.
Figure 7:
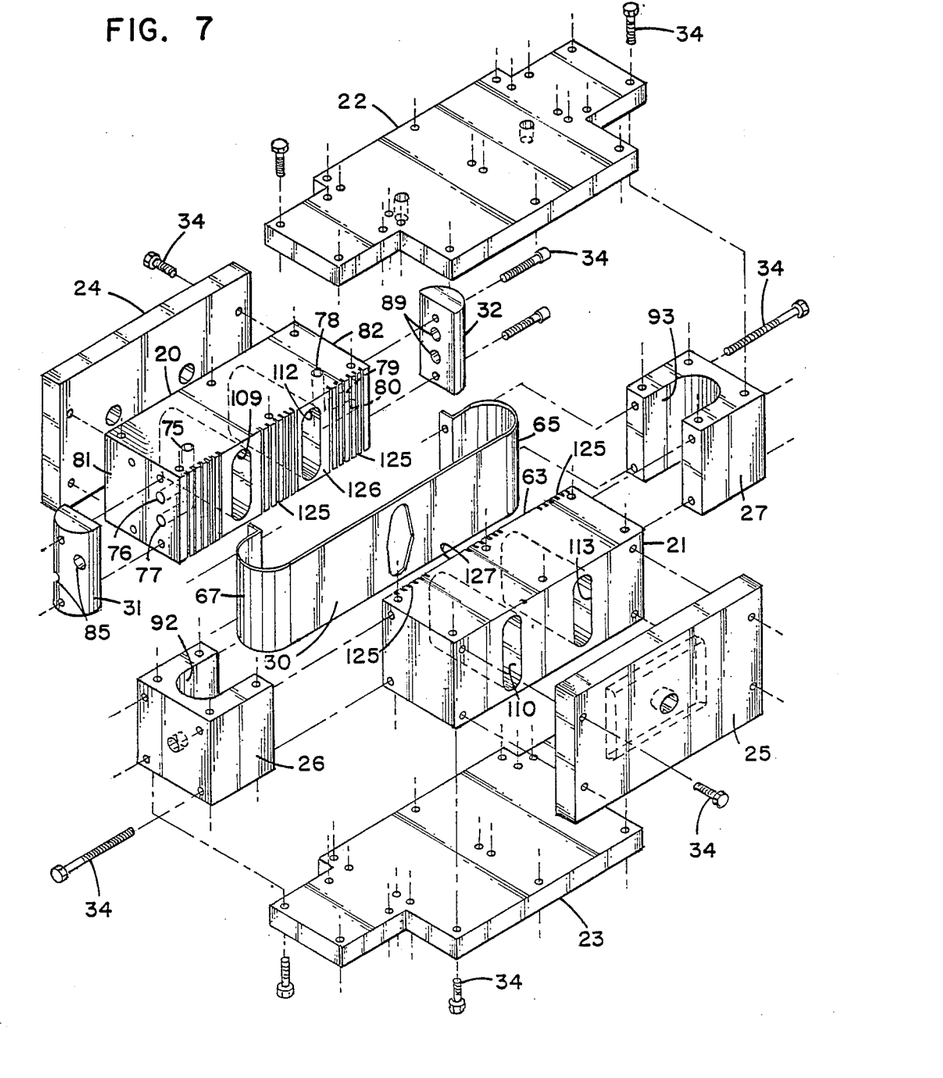
FIG. 7 is an exploded perspective view of a valve arrangement according to the present invention, having depicted therewith a curtain member according to the embodiment depicted in FIG. 3.

Referring to FIGS. 1, 2 and 7, the valve arrangement 1 depicted comprises a plurality of appropriately machined, cast or otherwise manufactured pieces, which are interfit during operational assembly. In particular, valve 6 includes first and second central blocks 20 and 21, a top plate 22, a bottom plate 23, front and rear plates 24 and 25 respectively, and opposite side blocks 26 and 27. The purposes of blocks 20, 21, 26 and 27, and plates 22, 23, 24 and 25 will become apparent from the following descriptions. Assembly of these elements to form the overall arrangement 1, will be apparent from examination of FIG. 7, an exploded view of the assembly 1. In FIGS. 2 and 7, the other major components of assembly 1 are readily viewable, these being the valve member or curtain member 30 and first and second opposite side stops or stop blocks 31 and 32, respectively. It is noted that terms such as "top", "bottom", "front", "rear", "side", "left", "right", "inlet" and "outlet" as used herein are meant generally only to refer to the drawings for convenience, and are not to be interpreted as limiting.

In FIG. 7, the components are shown mounted in engagement with one another by means of bolts 34. It will be understood that a variety of fastening means may be utilized in cooperation with, or as an alternative to, bolts. Also, in other embodiments, the valve arrangement 1 may be made with fewer components. In general, the reference numeral 34 designates the bolts generally, even though various lengths of bolts 34 may be needed in various portions of the arrangement 1.

Referring to FIG. 2, the general internal fluid flow pattern for the specific valve arrangement 1 depicted may be readily understood. In particular, flow passageways through two-way valve 6 are generally indicated in phantom lines. Specifically, a first fluid flow conduit is shown at 40, with a second fluid flow conduit at 41 and a main trunk line conduit at 42. In chamber or region 43 all three conduits 40, 41 and 42 merge. That is, region 43 provides a collection recess for merger of the conduits 40, 41 and 42.

A typical mode of operation for arrangement 1 will be understood by comparison of FIGS. 1 and 2. In particular, for the embodiment shown line 8 is an inlet line which communicates with fluid flow conduit 40 at end 45; second line 9 engages fluid flow conduit 41 at end 46, and provides same in communication with a vacuum draw, not shown; and, trunk line 10 engages trunk outlet 42 at end 47. It will be understood that a variety of engagement arrangements may be utilized, including conventional threaded coupling arrangements or the like.

For the particular embodiment depicted, conduit ends 45 and 46 are in front plate 24, and region 43 and trunk outlet 42 are in opposite rear plate 25.

Operation of two-way valve 6, in general, will be readily understood by examination of FIG. 2. In particular, applying a pressure from line 8, through valve 6 and to line 10, is a matter of maintaining conduit 40 open, while simultaneously blocking conduit 41, if conduit 40 is in communication with a source of positive fluid pressure, and conduit 41 a source of vacuum. Alternatively, maintaininq a vacuum as a result of line 9, on trunk line 10, is merely a matter of providing that conduit 41 is open at the same time conduit 40 is blocked. Alternating blocking and opening of conduits 40 and 41 is provided by means of flexible curtain member 30, FIG. 2.

Figure 3:
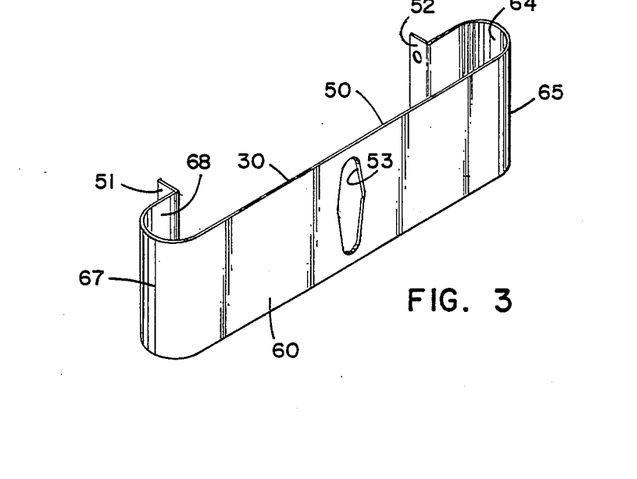
FIG. 3 is an enlarged perspective view of a curtain member according to a first embodiment of the present invention, for use in a valve arrangement as depicted in FIGS. 1 and 2.

Referring to FIG. 3, curtain member 30 is depicted in perspective. Member 30 comprises an elongate flexible strip 50 having first and second ends 51 and 52, and central aperture 53. In general, strip 50 should be very flexible, almost ribbon-like, but relatively strong. For example, strip 50 can be made from relatively thin (0.001–0.005 inches or 0.002–0.013 cm) stainless steel. In FIG. 3, strip 50 is depicted configured as it would be, if mounted in valve arrangement 1. In general, strip 50 would not retain the configuration of FIG. 3 on its own. That is, the configuration is maintained by support means described below.

Referring to FIG. 2, strip 50 is mounted with ends 51 and 52 anchored, as for example by means of bolts 55 and 56, respectively. Thus, during operation ends 51 and 52 of strip 50 do not move. However, central portion 60 of strip 50, having aperture 53 therein, can be rolled or slid back and forth along a path generally as indicated by double-headed arrow 62, FIG. 2, to move aperture 53 between first and second extreme positions. That is, while ends 51 and 53 are anchored, the portions adjacent the central portion 60 of strip 50 deform to allow the aperture 5 in the central portion 60 to be laterally displaced. In general, the valve 6 defines a curtain member gap or track 63 in which the curtain member central portion 60 is slidably received. For the typical embodiment, the gap 63 extends substantially transverse to the conduits 40 and 41. In the preferred embodiment, the gap 63 extends perpendicularly to longitudinal axes of the conduits 40 and 41.

Preferably, elements of arrangement 1 are selected and sized such that when in a first extreme position, aperture 53 overlaps conduit 40, to open same. This extreme position is depicted in FIG. 2. In the alternate extreme position, aperture 53 is moved out of alignment with conduit 40, to close same. For the two-way valve shown, in the second extreme position aperture 53 is aligned with conduit 41 to open same, and when the curtain member 30 is in the first extreme position conduit 41 is occluded.

Figure 4:
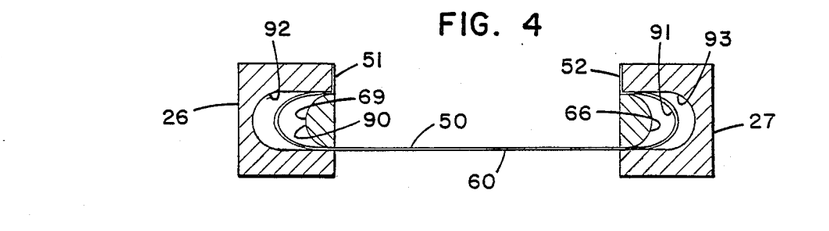
FIG. 4 is a schematic view illustrating, from a generally top plan orientation, a curtain member according to the present invention in a generally central or neutral position, with respect to portions of an associated valve assembly according to the present invention.
Figure 5:
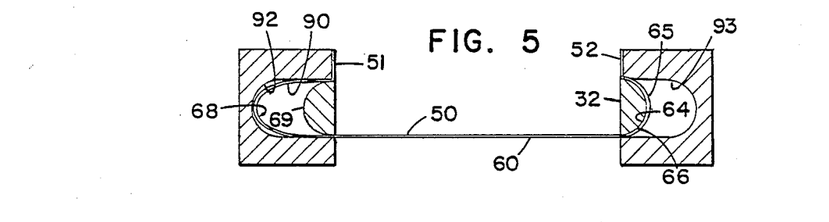
FIG. 5 is a schematic view generally analogous to that shown in FIG. 4, but with the curtain member depicted in a position of extreme movement (to the left in the drawing).
Figure 6:
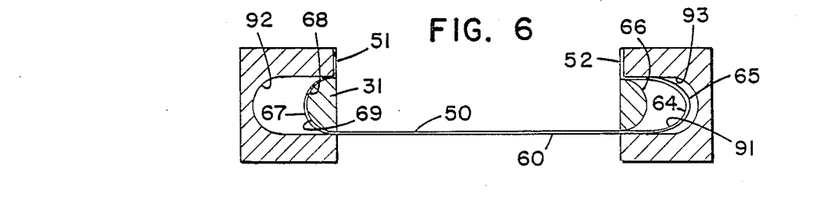
FIG. 6 is a schematic view generally analogous to those of FIGS. 4 and 5, but with a curtain member depicted in an opposite extreme (right) position.

Rolling or sliding movement of the central portion 60 of strip 50 will be understood by comparison of FIGS. 4, 5 and 6. In FIG. 4, strip 50 is shown centrally positioned. That is, the aperture 53 (not viewable in FIGS. 4, 5 and 6) is centered between side blocks 26 and 27. Thus, if the remainder of valve assembly 1 were depicted in FIG. 4, the aperture 53 would be viewed as positioned centrally between conduits 40 and 41.

In FIG. 5, strip 50 is shown rolled or slid to an extreme left position, which would move the central aperture 53, FIG. 3, to open conduit 40, FIG. 2. Stop 32, FIG. 5, stops rolling movement of strip 50 when a concave side 64 of cup, roll or roll-cup portion 65 becomes pressed thereagainst. Thus, stop 32 can be sized and shaped to insure a desirable overlap between aperture 53 and conduit 40. Preferably stop 32 has a convex outer surface 66 generally aligned with concave side 64, for operational engagement.

In FIG. 6, strip 50 is shown in an extreme right position, i.e. with cup, roll or roll-cup portion 67 abutting stop 31. Upon examination of FIGS. 2 and 3, it will be understood that in this extreme right position, aperture 53 would be in alignment with conduit 41, to open same. Analogously to roll-cup portion 65, roll-cup portion 67 has a concave side 68 which engages stop 31. Preferably, stop 31 has a convex outer surface 69 generally aligned with concave side 68, for operational engagement.

Again, by examination of FIGS. 3, 4, 5 and 6, it will be understood that the motion of strip 50 is a rolling/sliding motion, with ends 51 and 52 being nonmovably anchored throughout.

Due to its shape and structure, curtain member 30, or strip 50, is extremely lightweight and flexible. As a result of its lightweight, flexible, character, it can be moved very rapidly between extreme positions. This is desirable, since valve arrangements according to the present invention are specifically designed to be capable of rapid cycling, for example on the order of 40–60 milliseconds or less, between extreme positions. As a result, alternating pressure and vacuum can be applied to outlet conduit 42, and line 10, rapidly and efficiently. Further, the valve arrangement can be used to efficiently control passage of rather large flows of fluid, such as air, for example at flow rates of the order of about 150–300 ft$^3$/min.

Biasing means are used to control the position of member 60.

Referring to FIG. 1, control unit 5 by means of flow lines 12 and 13, is used to direct the position of curtain member 30. In particular, pulses of air are directed through lines 12 and 13, alternatingly, to bias curtain member 30 between the extreme positions of FIGS. 5 and 6. More specifically, a pulse of air through line 12 would result in the extreme position of FIG. 5, and a pulse of air through line 13 would result in the extreme position of FIG. 6.

Biasing means in valve arrangement 1 facilitate movement of curtain member 30 as a result of pulses of air provided through lines 12 and 13, as will be understood by reference to FIGS. 2 and 7. In particular, in FIG. 7, block 20 is shown having a conduit 75 therein which extends downwardly and into communication with lateral channels 76 and 77. Similarly, block 20 includes a second conduit 78 which extends downwardly into communication with lateral channels 79 and 80. As air is directed through conduit 75 and outwardly from face 81 by channels 76 and 77, it can be directed against portion 67 of strip 50, to bias strip 50 toward the left, FIG. 2. Similarly, if an air pulse is directed down conduit 78 and outwardly at face 82 by channels 79 and 80, it is directed against portion 65, to bias same toward the right in FIG. 2, i.e. toward the extreme orientation shown in FIG. 6.

Referring to FIG. 2, passageways 85 in side stop 31 provide for air flow communication with conduit 75, and dispersion of air flow into region 90 between stop 31 and portion 67. Similarly, passageways 89 in side stop 32 disperse air, by fluid flow communication with conduit 78, into the region 91 between side stop 32 and portion 65.

Referring to FIGS. 2, 4 5, 6 and 7, side blocks 26 and 27 generally enclose roll-cup portions 67 and 65, providing for an area of open volume in each, 92 and 93, respectively, for accommodation of the rolling movement of the strip 50. Side blocks 26 and 27 also pinch ends 51 and 52, respectively, and anchor same. Referring to FIG. 2, each of blocks 26 and 27 includes an exit port, 99 and 100 respectively, therein. The exit ports 99 and 100 allow for escape of air from regions 92 and 93, respectively, to prevent significant pressure build up therein. Thus, escape ports 99 and 100 facilitate rolling movement of strip 50.

Referring to FIG. 1, if the valve arrangement 1 is cycled rather rapidly and continuously, movement of the curtain member (not shown in FIG. 1) between the two extreme positions, and forcing air inwardly and outwardly from ports 99 and 100, would tend to cause a repeated popping sound. If desired, this popping sound can be muffled, by flow connecting the opposite ports 99 and 100 with a conduit such as a hose. In FIG. 1, a conduit for this purpose is shown in phantom lines at reference number 105, as an optional attachment to the valve arrangement 1.

Referring to FIG. 7, for the preferred embodiment conduits 40 and 41, extending through blocks 20 and 21, are divided into sections. In particular, conduit 40 comprises sections 109 and 110 and conduit 41 comprises sections 112 and 113. Significantly, the preferred conduit sections 109, 110, 112 and 113 are oblong- or oval-shaped, and they are considerably larger in cross-section than apertures 45 and 46. Thus, conduits 40 and 41 are "non-restrictive" with respect to typical fluid flow into valve arrangement 1. That is, FIG. 1, air flow moving into the valve 1 through any of the conduits 8, 9 or 10 is not significantly restricted as it moves therefrom into arrangement 1, rather it flows into conduits of larger cross-section. This facilitates rapid fluid flow through arrangement 1. It is noted that for the preferred embodiment, FIG. 7, the oblong conduits 40 and 41 are each aligned with opposite, planar, sidewalls thereof oriented substantially vertically.

For the embodiment depicted conduit sections about 1.25–1.75 inches (3.3–4.4 cm) high and about 0.25–0.75 inches (0.64–1.8 cm) wide can be used in valve arrangements 1, for use in controlling fluid flow on the order of about 150–300 ft$^3$/min. Herein, the "width" of an oblong conduit will be understood to be the distance between opposite parallel sides thereof, with "height" being the distance between opposite curved ends. It will be understood that the dimensions given are representative of a preferred embodiment, and they are not limiting, at least with respect to the general concepts of the invention.

With a rather large, rapid, flow of air through conduits 40 and 41, it is preferable to shape and size the aperture 53 in curtain member 30 in a manner facilitating movement of curtain member 30, without a substantial likelihood of catching edges of any of the conduit sections 109, 110, 112 and 113. A preferred aperture shape for achieving this will be understood by reference to FIG. 8.

Figures 8, 9:
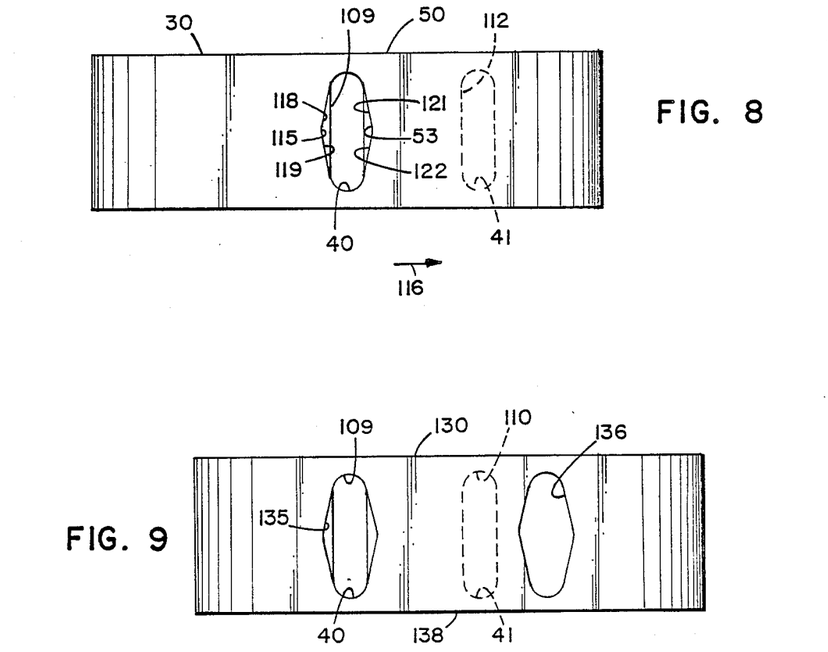
FIG. 8 is a front elevational view of a curtain member such as that depicted in FIG. 3, shown in operative association with a pair of fluid transport conduits and shown in an extreme (left) position.
FIG. 9 is a side elevational view generally analogous to that shown in FIG. 8, but of a curtain member according to an alternate embodiment shown in an extreme (right) position.

In FIG. 8, aperture 53 is shown having a somewhat "diamond" shape (with curved upper and lower vertices). That is, the diamond is vertically oriented with a wide center. The aperture 53 is about the same height as the conduit sections 109 and 12 with which it is to align during operation; however it is somewhat wider at its middle section 115, than either conduit section 109 or 112. Thus, as aperture 53 is moved in the direction of arrow 116, from conduit section 109 to conduit section 112, the tapering or shape of edges 118 and 119, of aperture 53, causes a gradual, rather than abrupt, reduction of overlap with the conduit section 109. This reduces the likelihood that edges 118 and 119 would catch on the lip of section 109 (or its accompanying opposite section 110, FIG. 1). Similarly, edges 121 and 122 insure a more gradual, rather than abrupt, overlap with section 112 and, eventually, a gradual reduction of overlap with section 112, when motion in the opposite direction of arrow 116 occurs in a later step in the cycling of member 30.

Referring to FIG. 7, it will be understood that with relatively large volumes of fluid (for example air) passing through assembly 1, it is preferred to provide for appropriate fluid seals at certain junctions. In particular, at the gap or track 63 between blocks 20 and 21, a labyrinthine air seal arrangement is provided. This arrangement comprises a plurality of vertical slits or slots 125 oriented in alignment across from one another, FIG. 2, in faces 126 and 127 of blocks 20 and 21, respectively. The slots 125 will interrupt fluid flow passing between blocks 20 and 21, and thus generate a labyrinthine-type seal. It is also noted that the fluid build-up in the slots 125 will, in some instances, generate a fluid cushion facilitating sliding movement of member 30.

Seals in upper and lower regions of assembly 1 can be provided by use of snugly fitting top and bottom plates 22 and 23. It is noted that for preferred embodiments, member 30 will be sized to gently abut plates 22 and 23.

Referring again to FIGS. 2, 4, 5 and 6, and in summary, significant advantage is obtained from the unique nature of the curtain member 30. The anchored ends 51 and 52, mounted in a generally C-shaped orientation with opposite loops or roll-cups 65 and 67, generate an arrangement efficiently moved. In particular, the loops 65 and 67 cause rapid movement of center section 60 of strip 50, in response to air pressure provided directed thereagainst by the biasing means. If the ends 51 and 52 were not anchored, movement would be less efficient, since a greater lateral motion of a larger amount of curtain member 30 would be necessary to move the aperture 53 the same distance. That is, generally a greater amount of work would be required to slide the entire curtain member between the two extreme positions than is required to roll the roll-cups 65 and 67 with the ends 51 and 52 anchored, since a greater lateral motion of a larger mass of curtain member 30 would be necessary to move the aperture 53 the same distance. Arguably, this latter is only the case if the curtain member is sufficiently flexible. That is, if little energy is required to cause the deformation.

It is noted that in some embodiments, not shown, alternatives to a C-configuration may have utility. For example, in some applications an S-configuration involves 2 roll-cups and a central portion may have utility.

Figure 10:
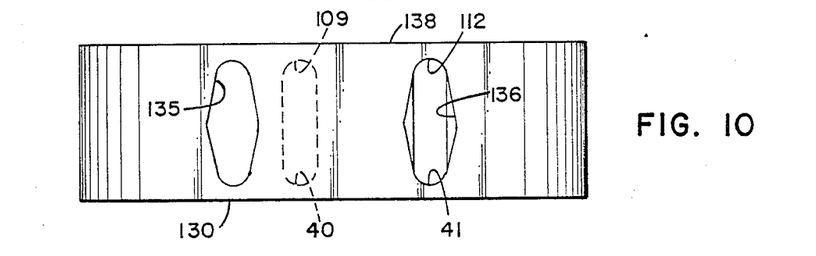
FIG. 10 is generally analogous to FIG. 9, but with a curtain member depicted in an opposite extreme (left) position.

Referring to FIGS. 9 and 10, an alternate embodiment will be understood. In particular, a purpose of FIGS. 9 and 10, is to illustrate that alternate aperture arrangements in the curtain member may be used. Another purpose of FIGS. 9 and 10 is to illustrate a particularly advantageous and efficient arrangement for the aperture(s) in the curtain member.

In FIGS. 9 and 10, alternate curtain member 130 is depicted. It will be understood that, but for the aperture arrangement, curtain member 130 may be substantially the same as curtain member 30, FIG. 3. That is, it could be dimensionally about the same and shaped in the same manner, including ends to be anchored (not in view).

FIGS. 9 and 10 are generally analogous to FIG. 8, and thus show member 130 in operative association with conduits 40 and 41.

Curtain member 130 differs significantly from curtain member 30, in that member 130 has two apertures 135 and 136 therein each of which, for the preferred embodiment, has a diamond shape analogous to aperture 53, FIG. 8. The apertures 135 and 136 are appropriately positioned so that when member 130 is in a central position, analogous to that shown for member 30 in FIG. 4, aperture 135 partially overlaps conduit 40, and aperture 136 partially overlaps aperture 41. When in the right-most extreme position, analogous to that shown in FIG. 6 for member 30, aperture 135 completely opens conduit 40, and conduit 41 is completely occluded, FIG. 9. On the other hand, when member 130 is in the extreme left position, analogous to that shown in FIG. 5 for member 30, aperture 136 completely opens conduit 41, and conduit 40 is completely occluded, FIG. 10.

It will be readily understood by examination of FIGS. 9 and 10 that two major differences between members 130 and 30 result. First, the total movement between extreme positions of the member 130 shown in FIGS. 9 and 10 is less than that for the member shown in FIG. 8. In particular, the central section 138 for member 130 needs to only move about half as far as central section 60 for member 30, in order to cycle between an opening of the two conduits 40 and 41. Secondly, for the arrangement shown in FIG. 9, in the extreme right orientation, conduit 40 is open, whereas when member 30 is in the extreme right orientation conduit 41 is open, FIG. 8. Similarly, when member 130 is in the extreme left position, FIG. 10, conduit 41 is open; whereas, when member 30 is in the extreme right position, FIG. 8, conduit 40 is open.

Since the central portion 138 of member 130 needs to only move half as far as the central portion 60 of member 30, in order to cycle between the two conduits 40 and 41, member 130 can be operated even more rapidly than member 30.

As suggested, member 130 may be basically introduced into arrangement 1 with little modification. However, referring to FIGS. 4, 5 and 6, it will be understood that the size and/or position of stops 31 and 32 may need to be changed and/or the size of side blocks 26 and 27. That is, gaps 92 and 93 need to be sized appropriately for member 130, which will move less distance than member 30. Also, different dimensions for member 130 could be used.

It is noted that each of members 30 and 130 is relatively thin. In general, it is desirable to provide no greater than about 0.0005 inches (0.013 cm) of tolerance, between member 30 or 130, and each of opposite block walls 126 and 127 between which the curtain member slides. That is, the gap or track between blocks 20 and 21 should be on the order of about 0.001 inches (0.0026 cm) greater than the thickness of a curtain member positioned therebetween. This can be readily accomplished by partially assembling the components of arrangement 1, with an appropriate sized shim between blocks 20 and 21. The shim can then be removed, and the appropriate curtain member positioned between blocks 20 and 21, during later stages of assembly.

It is to be understood that while certain specific embodiments of the present invention are shown and described in detail, the invention is not to be limited to the specific form or arrangement of parts herein described and shown.

What is desired to be secured by Letters Patent is as follows:

1. A valve arrangement comprising:
   (a) a valve body defining a first fluid flow conduit extending therethrough and a curtain member track extending transverse to said first fluid flow conduit;
  (i) said first fluid flow conduit having a substantially oblong shape in cross-section, with first and second, substantially planar, opposite sidewall sections; said sidewall sections being oriented in a plane substantially perpendicular to said curtain member track;
(b) a flexible curtain member having a central portion and first and second end portions;
  (i) said curtain member being operatively mounted with said end portions nonmovably secured, and with said central portion received within said curtain member track;
  (ii) said curtain member being mounted in a configuration defining first and second opposite roll-cups adjacent said first and second end portions respectively; said curtain member central portion, as a result of said roll-cups, being slidable in said track, and transversely of said first fluid flow conduit, between first and second extreme positions;
  (iii) said curtain member central portion having a first aperture therein: operably alignable in overlap with said first fluid flow conduit whenever said curtain member is in said first extreme position; and, not alignable in overlap therewith, when said curtain member is in said second extreme position; said curtain member first aperture being substantially diamond-shaped with an upper vertex and with a central, wide, portion thereof wider than a distance between said first flow circuit opposite sidewall sections; and
(c) biasing means for facilitating selective biasing of said curtain member between said first and second extreme positions.

2. A valve arrangement according to claim 1 wherein:
(a) said biasing means includes first and second air pulse directing arrangements; said first air pulse directing arrangement directing a selected first air pulse toward a concave side of said first roll-cup, and said second air pulse directing arrangement directing a selected second air pulse toward a concave side of said second roll-cup.

3. A valve arrangement according to claim 1 wherein:
(a) said curtain member track is defined by opposite substantially parallel planar faces having a gap therebetween, each of said planar faces having a plurality of vertical slots therein.

4. A valve arrangement according to claim 1 having:
(a) a first convex stop block oriented with a convex side thereof aligned with and directed toward a concave side of said first roll-cup; said first stop block being sized and positioned to abut said first roll-sup when said curtain member is in said first extreme position; and,
(b) a second convex stop block oriented with a convex side thereof aligned with and directed toward a concave side of said second roll-cup; said second stop block being sized and positioned to abut said second roll-cup when said curtain member is in said second extreme position.

5. A valve arrangement according to claim 4 wherein:
(a) said biasing means includes first and second air pulse directing arrangements; said first air pulse directing arrangement directing a first selected air pulse toward a concave side of said first roll-cup, and said second air pulse directing arrangement directing a selected second air pulse toward a concave side of said second roll-cup.

6. A valve arrangement according to claim 5 wherein:
(a) said first air pulse directing arrangement includes a pulse conduit directed outwardly from said first stop block and toward said concave side of said first roll-cup; and,
(b) said second air pulse directing arrangement includes a pulse conduit directed outwardly from said second stop block and toward said concave side of said second roll-cup.

7. An arrangement according to claim 5 including:
(a) a top plate having first and second bores therein; said first bore being in fluid flow communication with said first air pulse directing arrangement, and said second bore being in fluid flow communication with said second air pulse directing arrangement.

8. A valve arrangement according to claim 1 wherein:
(a) said curtain member has a generally C-shaped configuration.

9. A valve arrangement according to claim 1 wherein:
(a) said valve body includes a second fluid flow conduit extending therethrough, said curtain member track being substantially transverse to said second fluid flow conduit.

10. The valve arrangement according to claim 9 wherein:
(a) said curtain member first aperture is alignable with said second fluid flow conduit, when said curtain member is in said second extreme position.

11. A valve arrangement according to claim 10 wherein:
(a) said first and second fluid flow conduits are substantially identical in cross-section.

12. A valve arrangement according to claim 10 wherein:
(a) said second fluid flow conduit has a substantially oval shape in cross-section, with third and fourth, substantially planar, opposite sidewall sections; said third and fourth sidewall sections being oriented substantially, perpendicularly to said curtain member track; and
(b) said curtain member first aperture central, wide, portion is wider than a distance between said second flow conduit third and fourth opposite sidewall sections.

13. A valve arrangement according to claim 9 wherein:
(a) said curtain member central portion includes a second aperture therein operably alignable in overlap with said second fluid flow conduit whenever said curtain member is in said second extreme position, and not alignable in overlap therewith, when said curtain member is in said first extreme position;
(b) said curtain member first aperture not being operably alignable with said second fluid flow conduit, and said second aperture not being operably alignable with said first fluid flow conduit.

14. An arrangement according to claim 9 wherein:

(a) each of said first and second fluid flow conduits has a first end and a second end; and,
(b) said arrangement includes: means for mounting a first fluid line in association with said first fluid flow conduit first end; and, means for mounting a second fluid line in association with said second fluid flow conduit second end.

15. An arrangement according to claim 14 wherein:
(a) said means for mounting a first fluid line and said means for mounting a second fluid line collectively include a plate having first and second bores therein, one each of said bores being operatively aligned with one each of said fluid flow conduits.

16. An arrangement according to claim 14 including:
(a) means for mounting a single outlet flow line in operative association with both of said first flow circuit second end and said second flow conduit second end.

17. An arrangement according to claim 16 wherein:
(a) said means for mounting an outlet flow line includes a plate having: a collection recess operably oriented in fluid flow communication with both of said first and second fluid flow association with said collection areas.

18. An arrangement according to claim 1 wherein:
(a) said valve body includes first and second central blocks spaced apart from one another to define said curtain member track therebetween.

19. An arrangement according to claim 18 wherein:
(a) said curtain member comprises a metal strip having a uniform thickness of about 0.001 to 0.005 inches; and,
(b) said first and second central blocks are spaced at least about 0.001 inches further apart than said thickness of said curtain member.

20. A valve arrangement comprising:
(a) a valve body defining a first fluid flow conduit extending therethrough and a curtain member track extending transverse to said first fluid flow conduit; and,
(b) a flexible curtain member having a central portion and first and second end portions;
  (i) said curtain member being operatively mounted with said end portions nonmovably secured, and with said central portion received within said curtain member track;
  (ii) said curtain member being mounted in configuration defining a pair of opposite roll-cups one each of which is adjacent one of said first and second end portions respectively; said curtain member central portion, as a result of said roll-cups, being slidable in said track, and transversely of said fluid flow conduit, between first and second extreme positions; and,
  (iii) said curtain member central portion having a first aperture therein: operably alignable in overlap with said first fluid flow conduit whenever said curtain member is in said first extreme position; and, not alignable in overlap therewith, when said curtain member is in said second extreme position; said curtain member first aperture being substantially diamond-shaped with an upper vertex and with a central, wide, portion thereof wider than a transverse distance across said first fluid flow conduit, at said curtain member track.

21. A valve arrangement according to claim 20 having:

(a) a first convex stop block oriented with a convex side thereof aligned with and directed toward a concave side of a first one of said roll-cups; said first stop block being sized and positioned to abut said first one of said roll-cups when said curtain member is in said first extreme position; and,
(b) a second convex stop block oriented with a convex side thereof aligned with and directed toward a concave side of a second one of said roll-cups; said second stop block being sized and positioned to abut said second one of said roll-cups when said curtain member is in said second extreme position.

22. A valve arrangement according to claim 20 including:
(a) biasing means for facilitating selective biasing of said curtain member between said first and second extreme positions; said biasing means including first and second air pulse directing arrangements; said first air pulse directing arrangement directing a first selected air pulse toward a concave side of said first one of said roll-cups, and said second air pulse directing arrangement directing a selected second air pulse toward a concave side of said second one of said roll-cups.

23. A valve arrangement comprising:
(a) a valve body defining a first fluid flow conduit extending therethrough and a curtain member track extending transverse to said first fluid flow conduit; and,
(b) a flexible curtain member having a central portion and first and second end portions;
  (i) said curtain member being operatively mounted with said end portions nonmovably secured, and with said central portion received within said curtain member track;
  (ii) said curtain member being mounted in configuration defining a pair of opposite roll-cups, one each of which is one of adjacent said first and second end portions respectively; said curtain member central portion, as a result of said roll-cups, being slidable in said track, and transversely of said fluid flow conduit, between first and second extreme positions;
  (iii) said curtain member central portion having a first aperture therein: operably alignable in overlap with said first flow circuit whenever said curtain member curtain is in said first extreme position; and, not alignable in overlap therewith, when said curtain member is in said second extreme positions;
(c) a first convex stop block oriented with a convex side thereof aligned with, and directed toward, a concave side of a first one of said roll-cups; said first stop block being sized and positioned to abut said first one of said roll-cups, and stop motion of said curtain member, when said curtain member is moved into said first extreme position; and,
(d) a second convex stop block oriented with a convex side thereof aligned with, and directed toward, a concave side of a second one of said roll-cups; said second stop block being sized and positioned to abut said second one of said roll-cups, and stop motion of said curtain member, when said curtain member is moved into said second extreme position.

24. A valve arrangement according to claim 23 wherein:

(a) said curtain member track is defined by opposite, substantially parallel, planar faces having a gap therebetween, each of said planar faces having a plurality of vertical slots therein.

25. A valve arrangement according to claim 23 wherein:
   (a) said first fluid flow conduit has a substantially oblong shape in cross-section, with first and second, substantially planar, opposite sidewall sections; said sidewall sections each being oriented in a plane substantially perpendicular to said curtain member track; and,
   (b) said curtain member first aperture is substantially diamond-shaped with an upper vertex, and with a central, wide, portion thereof being wider than a distance between said first flow conduit opposite sidewall sections.

26. An arrangement according to claim 23 wherein said curtain member comprises a metal strip having a uniform thickness of about 0.001 to 0.005 inches.

27. A valve arrangement comprising:
   (a) a valve body defining first and second fluid flow conduits extending therethrough and a curtain member track extending transverse to said first and second fluid flow conduits;
   (b) a flexible curtain member having a central portion and first and second end portions;
      (i) said curtain member being operatively mounted with said end portions nonmovably secured, and with said central portion received within said curtain member track;
      (ii) said curtain member being mounted in configuration defining a pair of opposite roll-cups one each of which is adjacent one each of said first and second end portions respectively; said curtain member central portion, as a result of said roll-cups, being slidable in said track, and transversely of said fluid flow conduit, between first and second extreme positions;
      (iii) said curtain member central portion having a first aperture therein: operably alignable in overlap with said first flow circuit whenever said curtain member curtain is in said first extreme position; and, not alignable in overlap therewith, when said curtain member is in said second extreme position;
      (iv) said curtain member central portion having a second aperture therein: operably alignable in overlap with said second fluid flow conduit whenever said curtain member is in said second extreme position; and, not alignable in overlap therewith, when said curtain member is in said first extreme position; and,
      (v) a lateral distance between minimally spaced portions of said first and second curtain member apertures being greater than a lateral distance between center of said first and second fluid flow conduits.

28. A valve arrangement according to claim 26 wherein:
   (a) said curtain member first aperture is substantially diamond-shaped with an upper vertex, and with a central, wide, portion thereof wider than a distance across said first fluid flow circuit; and,
   (b) said curtain member second aperture is substantially diamond-shaped with an upper vertex and with a central, wide, portion thereof wider than a distance across said second fluid flow conduit.

29. An arrangement according to claim 27 including:
   (a) a first convex stop block oriented with a convex side thereof aligned with, and directed toward, a concave side of a first one of said roll-cups; said first stop block being sized and positioned to abut said first one of said roll-cups, and stop motion of said curtain member, when said curtain member is moved into said first extreme position; and,
   (b) a second convex stop block oriented with a convex side thereof aligned with, and directed toward, a concave side of a second one of said roll-cups; said second stop block being sized and positioned to abut said second one of said roll-cups, and stop motion of said curtain member, when said curtain member is moved into said second extreme position.

* * * * *